United States Patent
Uotsu (10) Patent No.: US 12,179,803 B2
(45) Date of Patent: Dec. 31, 2024

(54) WORK VEHICLE WITH MANUAL DRIVING MODE, MANNED AUTOMATIC DRIVING MODE, AND UNMANNED AUTOMATIC DRIVING MODE

(71) Applicant: Hitachi Construction Machinery Co., Ltd., Tokyo (JP)

(72) Inventor: Shinichi Uotsu, Tsuchiura (JP)

(73) Assignee: Hitachi Constructions Machinery Co., Ltd., Tokyo (JP)

( * ) Notice: Subject to any disclaimer, the term of this patent is extended or adjusted under 35 U.S.C. 154(b) by 289 days.

(21) Appl. No.: 17/420,453

(22) PCT Filed: Feb. 4, 2020

(86) PCT No.: PCT/JP2020/004177
§ 371 (c)(1),
(2) Date: Jul. 2, 2021

(87) PCT Pub. No.: WO2020/195189
PCT Pub. Date: Oct. 1, 2020

(65) Prior Publication Data
US 2022/0089191 A1     Mar. 24, 2022

(30) Foreign Application Priority Data
Mar. 26, 2019   (JP) ................................. 2019-059249

(51) Int. Cl.
*B60W 60/00*     (2020.01)
*B60W 50/00*     (2006.01)
(Continued)

(52) U.S. Cl.
CPC ...... *B60W 60/0053* (2020.02); *B60W 50/082* (2013.01); *B60W 50/10* (2013.01);
(Continued)

(58) Field of Classification Search
None
See application file for complete search history.

(56) References Cited

U.S. PATENT DOCUMENTS

2017/0068249 A1\*  3/2017  Minowa ........... G08G 1/096816
2017/0123423 A1   5/2017  Sako et al.
(Continued)

FOREIGN PATENT DOCUMENTS

CN              107776567 A          3/2018
DE       10 2017 003 655 A1         10/2017
(Continued)

OTHER PUBLICATIONS

Ueda et al., "Work Vehicle", English Translation of WO 2018174249 A1, 2018, all. (Year: 2018).\*
(Continued)

*Primary Examiner* — James J Lee
*Assistant Examiner* — Tawri M McAndrews
(74) *Attorney, Agent, or Firm* — Crowell & Moring LLP (57) ABSTRACT

A work vehicle includes an override operation sensor that senses override operation to carry out switching between an automatic driving mode and a manual driving mode and a selection device for selecting any one of the manual driving mode, a manned automatic driving mode, and an unmanned automatic driving mode, as the driving mode of a dump truck. A controller carries out switching from the manned automatic driving mode to the manual driving mode when override operation is sensed by the override operation sensor in the case in which the manned automatic driving mode is selected by the selection device, and continues the unmanned automatic driving mode when override operation is sensed by the override operation sensor in the case in which the unmanned automatic driving mode is selected by the selection device.

1 Claim, 6 Drawing Sheets

| DRIVING MODE BASED ON SWITCHES 59a AND 59b | MODE SWITCHING WHEN OVERRIDE OPERATION IS SENSED (FIRST EMBODIMENT) |
|---|---|
| MANUAL DRIVING MODE | NOT CARRIED OUT |
| UNMANNED AUTOMATIC DRIVING MODE | NOT CARRIED OUT |
| MANNED AUTOMATIC DRIVING MODE | MANUAL DRIVING MODE |

(51) Int. Cl.
*B60W 50/08* (2020.01)
*B60W 50/10* (2012.01)

(52) U.S. Cl.
CPC ............... *B60W 2050/0063* (2013.01); *B60W 2050/0073* (2013.01); *B60W 2300/125* (2013.01)

(56) References Cited

U.S. PATENT DOCUMENTS

| | | | | |
|---|---|---|---|---|
| 2018/0056982 | A1* | 3/2018 | Endo | .................... B60W 20/20 |
| 2018/0093631 | A1* | 4/2018 | Lee | ..................... G06V 20/593 |
| 2018/0148063 | A1* | 5/2018 | Tatsushiro | ...... B60W 30/18009 |
| 2018/0362052 | A1 | 12/2018 | Matsumoto | |
| 2019/0092341 | A1* | 3/2019 | Stark | ................. B60W 60/0055 |
| 2019/0094855 | A1* | 3/2019 | Choi | .................... G05D 1/0061 |

FOREIGN PATENT DOCUMENTS

| | | | |
|---|---|---|---|
| JP | 2016-7920 A | 1/2016 | |
| JP | 2017-137034 A | 8/2017 | |
| JP | 2018-70135 A | 5/2018 | |
| JP | 2018-160270 A | 10/2018 | |
| JP | 2018-181058 A | 11/2018 | |
| SE | 1650557 A1 | 11/2017 | |
| WO | WO-2018174249 A1 * | 9/2018 | ........... A01B 33/082 |

OTHER PUBLICATIONS

International Search Report (PCT/ISA/210) issued in PCT Application No. PCT/JP2020/004177 dated Mar. 24, 2020 with English translation (four (4) pages).
Extended European Search Report issued in European Application No. 20778159.2 dated Oct. 24, 2022 (10 pages).
International Preliminary Report on Patentability (PCT/IB/338 & PCT/IB/373) issued in PCT Application No. PCT/JP2020/004177 dated Oct. 7, 2021, including English translation of document C2 (Japanese-language Written Opinion (PCT/ISA/237) filed on Jul. 2, 2021) (eight (8) pages).
Chinese-language Office Action issued in Chinese Application No. 202080007305.9 dated May 12, 2023 (6 pages).

* cited by examiner

|  |  | INPUT SIGNAL FROM SECOND SELECTION SWITCH 59b (MANNED AUTOMATIC DRIVING/UNMANNED AUTOMATIC DRIVING CHANGEOVER SWITCH) | |
|---|---|---|---|
|  |  | Low | High |
| INPUT SIGNAL FROM FIRST SELECTION SWITCH 59a (MANNED MANUAL DRIVING/ AUTOMATIC DRIVING CHANGEOVER SWITCH) | Low | MANUAL DRIVING MODE | MANUAL DRIVING MODE |
|  | High | UNMANNED AUTOMATIC DRIVING MODE | MANNED AUTOMATIC DRIVING MODE |

FIG. 4

| DRIVING MODE BASED ON SWITCHES 59a AND 59b | MODE SWITCHING WHEN OVERRIDE OPERATION IS SENSED (FIRST EMBODIMENT) |
|---|---|
| MANUAL DRIVING MODE | NOT CARRIED OUT |
| UNMANNED AUTOMATIC DRIVING MODE | NOT CARRIED OUT |
| MANNED AUTOMATIC DRIVING MODE | MANUAL DRIVING MODE |

| DRIVING MODE BASED ON SWITCHES 59a AND 59b | MODE SWITCHING WHEN OVERRIDE OPERATION IS SENSED (SECOND EMBODIMENT) |
|---|---|
| MANUAL DRIVING MODE | NOT CARRIED OUT |
| UNMANNED AUTOMATIC DRIVING MODE | FAILURE MODE |
| MANNED AUTOMATIC DRIVING MODE | MANUAL DRIVING MODE | ions
WORK VEHICLE WITH MANUAL DRIVING MODE, MANNED AUTOMATIC DRIVING MODE, AND UNMANNED AUTOMATIC DRIVING MODE

TECHNICAL FIELD

The present invention relates to a work vehicle having, as driving modes, at least two modes of an automatic driving mode in which the work vehicle autonomously travels without depending on driving operation by a riding person and a manual driving mode in which the work vehicle travels by driving operation by the riding person.

BACKGROUND ART

In work vehicles typified by dump trucks, there are automatic driving vehicles having, as driving modes, at least two modes of an automatic driving mode in which the work vehicle autonomously travels without depending on driving operation by a riding person and a manual driving mode in which the work vehicle travels by driving operation by the riding person. In the automatic driving mode, a controller mounted on the work vehicle is in charge of all of accelerator pedal operation (acceleration control), brake pedal operation (braking control), and steering wheel operation (steering control). However, when the automatic driving mode is being carried out in the state in which a riding person is present in a cab (operator's room) of the work vehicle, there is also the case in which driving operation by the riding person is required (for example, the case in which an abnormality occurs in the work vehicle, or the case in which an unexpected situation occurs). Thus, a technique of carrying out switching between manual driving and automatic driving exists.

For example, an automatic driving controller of patent document 1 includes sensing means that senses override operation performed by a driver (manual operation by the driver who rides in the vehicle) at the time of an automatic driving mode and determining means that determines whether or not driver posture that is the posture of the driver imaged by an in-vehicle camera corresponds with driving posture as a basis. (i) The automatic driving controller permits switching from the automatic driving mode to a manual driving mode when override operation is sensed by the sensing means and it is determined by the determining means that the photographed driver posture corresponds with the driving posture as the basis. (ii) The automatic driving controller does not permit switching from the automatic driving mode to the manual driving mode (that is, continues the automatic driving mode) when override operation is sensed by the sensing means and it is determined by the determining means that the photographed driver posture does not correspond with the driving posture as the basis.

PRIOR ART DOCUMENT

Patent Document

Patent Document 1: JP-2017-137034-A

SUMMARY OF THE INVENTION

Problem to be Solved by the Invention

In the automatic driving controller of patent document 1, the condition of switching from the automatic driving mode to the manual driving mode is set on the premise that the vehicle is always manned (that is, a riding person exists in the vehicle) in the automatic driving mode.

However, with a work vehicle such as a dump truck capable of autonomous travelling, the vehicle is unmanned (that is, a riding person does not exist in the vehicle) in the automatic driving mode in some cases. That is, as the automatic driving of the work vehicle, unmanned automatic driving in which a person does not ride in the vehicle and manned automatic driving in which a person rides in the vehicle can exist. For this reason, there is a need to prepare in advance not only the control in the case in which override operation is sensed in manned automatic driving, disclosed in patent document 1, but also control in the case in which override operation is sensed in unmanned automatic driving. For example, a transition to the manual driving mode (manned manual driving) may be made when override operation is sensed in manned automatic driving. However, if setting in which a transition to the manual driving mode is made when override operation is sensed in unmanned automatic driving is employed, manual driving is set with a riding person remaining absent, which results in the state in which vehicle control is abandoned. Furthermore, the method in which whether or not a riding person is present is determined by using a camera or the like as in patent document 1 involves the possibility of erroneous determination.

The present invention is made in view of such a problem and intends to provide a work vehicle that can carry out sure and proper control of the self-vehicle when override operation is sensed in the automatic driving condition of each of manned automatic driving and unmanned automatic driving.

Means for Solving the Problem

The present application includes plural means for solving the above-described problem. To cite one example thereof, there is provided a work vehicle having, as driving modes, at least two modes of an automatic driving mode in which the work vehicle autonomously travels without depending on driving operation by a riding person and a manual driving mode in which the work vehicle travels by driving operation by the riding person. In the automatic driving mode, a manned automatic driving mode in which the work vehicle autonomously travels in a state in which the riding person is present and an unmanned automatic driving mode in which the work vehicle autonomously travels in a state in which the riding person is absent are included. The work vehicle includes an override operation sensor that senses override operation to carry out switching between the automatic driving mode and the manual driving mode, a selection device for selecting any one of driving modes in the manual driving mode, the manned automatic driving mode, and the unmanned automatic driving mode, as the driving mode, and a controller that controls the work vehicle on the basis of the driving mode selected by the selection device. The controller is configured to carry out switching from the manned automatic driving mode to the manual driving mode when override operation is sensed by the override operation sensor in a case in which the manned automatic driving mode is selected by the selection device, and continue the unmanned automatic driving mode when override operation is sensed by the override operation sensor in a case in which the unmanned automatic driving mode is selected by the selection device.

Advantages of the Invention

According to the present invention, sure and proper control of the self-vehicle can be carried out when override operation is sensed in the automatic driving condition of each the manned automatic driving and the unmanned automatic driving.

MODES FOR CARRYING OUT THE INVENTION

Embodiments of the present invention will be described below by using the drawings.

Figure 1:
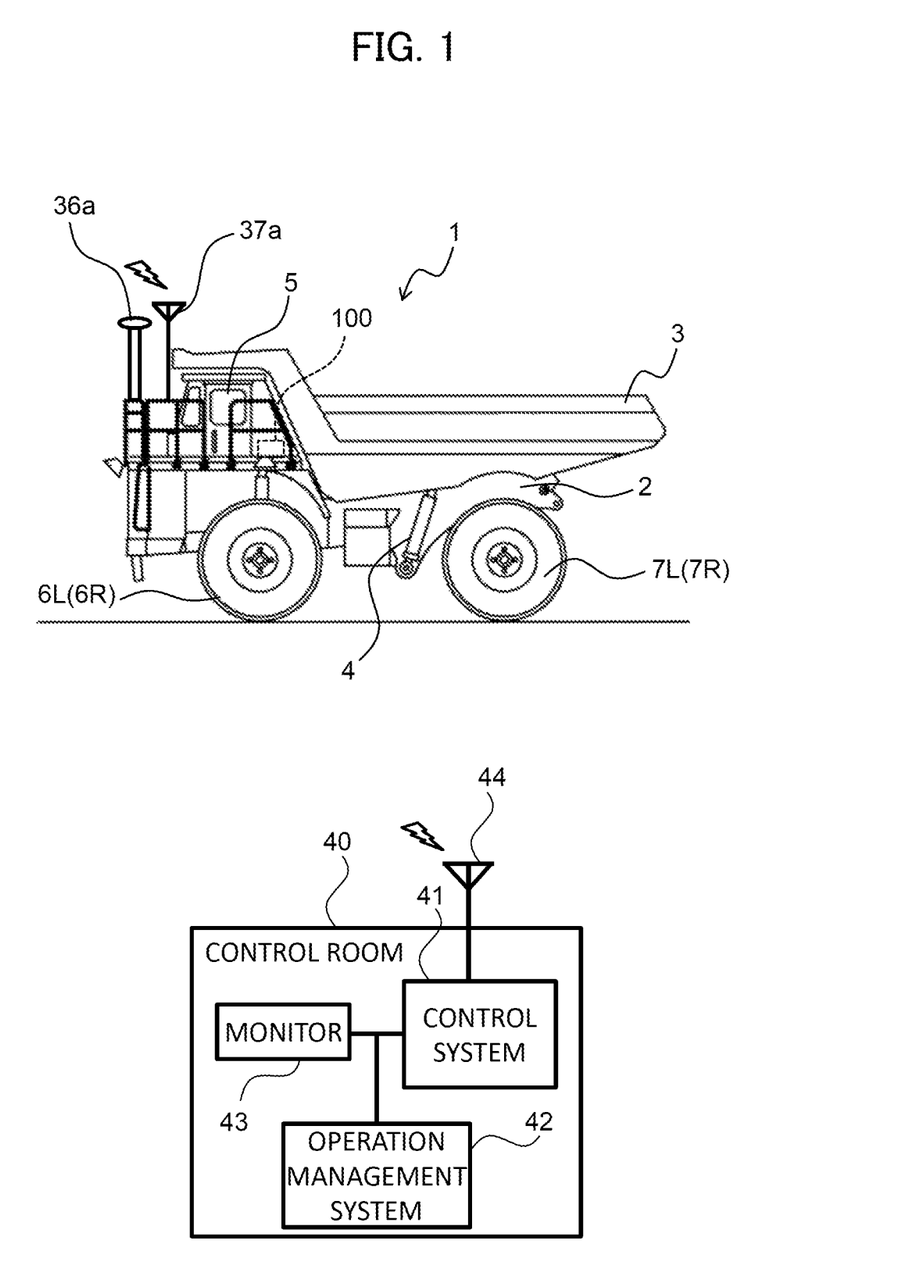
FIG. 1 is a side view of a dump truck that is a work vehicle (transportation vehicle) according to embodiments of the present invention.
Figure 2:
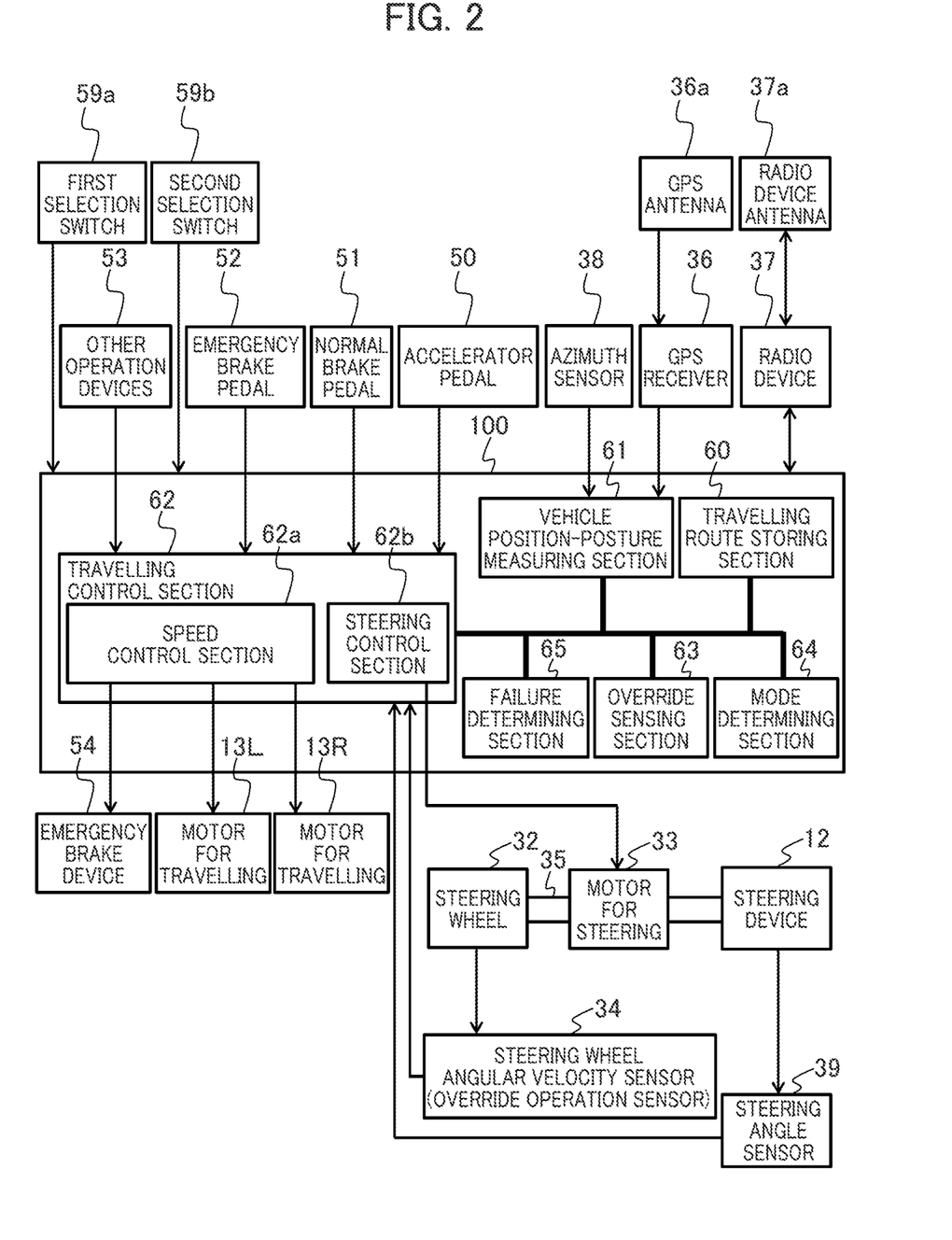
FIG. 2 is a configuration diagram of a vehicle control system according to the embodiments of the present invention.

FIG. 1 is a side view of a dump truck that is a work vehicle (transportation vehicle) according to the embodiments of the present invention. FIG. 2 is a configuration diagram of a vehicle control system according to the embodiments of the present invention.

In FIG. 1, a dump truck 1 includes a vehicle body 2, a vessel 3, a cab 5, left and right front wheels 6L and 6R, left and right rear wheels 7L and 7R, a GPS antenna 36a, a radio device antenna 37a, and a controller 100.

A control room 40 is a place where operation management of the dump truck 1 is carried out. In the control room 40, a radio antenna 44 for communication with the controller 100 of the dump truck 1, a control system 41 for outputting a travelling instruction and so forth relating to autonomous travelling to the dump truck 1, an operation management system 42 for allowing a control operator to create an operation plan including travelling route data of the dump truck 1, and a monitor 43 for allowing the control operator to check the operation status and so forth are set.

The vehicle body 2 of the dump truck 1 configures a frame structure. On the upper side of the vehicle body 2, the vessel 3 that can rise and fall, with the rear part side of the vehicle body 2 being the fulcrum, through extension and contraction of a hoist cylinder 4 is mounted.

The cab 5 is located on the front side of the vessel 3 and is disposed on the upper side of the front part of the vehicle body 2. This cab 5 forms an operator's room which a riding person (referred to also as driver or operator) of the dump truck 1 gets on and off. In the cab 5, a driving seat on which the riding person sits and an engine switch (neither is illustrated) are disposed. In addition, a steering wheel 32, an accelerator pedal 50, a normal brake pedal 51, an emergency brake pedal 52, and other operation devices 53 that are illustrated in FIG. 2 are disposed.

The front wheels 6L and 6R are rotatably disposed on the lower side of the front part of the vehicle body 2. The front wheel 6L is disposed on the left side of the vehicle body 2 and the front wheel 6R is disposed on the right side of the vehicle body 2. These left and right front wheels 6L and 6R configure wheels for steering regarding which a steering angle θ changes by a steering device 12 (see FIG. 2). Steering operation of the left and right front wheels 6L and 6R is carried out by the steering device 12 according to the rotation angle of the steering wheel 32 of the dump truck 1.

The rear wheels 7L and 7R are rotatably disposed on the rear part side of the vehicle body 2. The rear wheel 7L is disposed on the left side of the vehicle body 2 and the rear wheel 7R is disposed on the right side of the vehicle body 2. These left and right rear wheels 7L and 7R configure drive wheels of the dump truck 1 and are rotationally driven by left and right motors 13L and 13R for travelling (see FIG. 2). By rotationally driving the left and right rear wheels 7L and 7R, the dump truck 1 is driven to travel.

The motors 13L and 13R for travelling are disposed in the vehicle body 2. The motor 13L for travelling is mechanically connected to the left rear wheel 7L and drives the rear wheel 7L. The motor 13R for travelling is mechanically connected to the right rear wheel 7R and drives the rear wheel 7R. These motors 13L and 13R for travelling are electric motors and are rotationally driven by power supplied from a main generator (not illustrated) driven by an engine (not illustrated). The respective motors 13L and 13R for travelling are controlled by the controller 100 (speed control section 62a (to be described later)) and can be rotationally driven independently of each other.

Steering operation of the steering wheel 32 can be carried out by the riding person. When the steering wheel 32 is rotated left or right, a column shaft 35 (see FIG. 2) coupled to the steering wheel 32 rotates in the left or right direction according to the rotation of the steering wheel 32 and steering torque is generated. The steering torque input to the column shaft 35 actuates a steering valve (not illustrated). The steering valve carries out switching control of supply and discharge of a hydraulic operating fluid to left and right steering cylinders included in the steering device 12 according to the amount of rotation of the steering wheel 32. In the steering device 12, the left and right hydraulic cylinders (steering cylinders) corresponding to the left and right front wheels 6L and 6R are included. The hydraulic operating fluid is supplied from the steering valve in such a manner that, when one cylinder extends, the other cylinder contracts. That is, the steering device 12 is driven by the hydraulic operating fluid supplied and discharged through the steering valve and changes the steering angle θ of the front wheels 6L and 6R according to the rotation of the steering wheel 32.

For the steering wheel 32, a steering wheel angular velocity sensor 34 for sensing the angular velocity of the steering wheel 32 is disposed. The angular velocity of the steering wheel 32 sensed by the steering wheel angular velocity sensor 34 is output to the controller 100.

A steering angle sensor 39 is attached to the steering device 12 and senses the steering angle θ of, for example, the left front wheel 6L to output the steering angle θ to the controller 100. For example, the steering angle sensor 39 is configured by a rotation angle sensor of an electromagnetic pickup system composed of a Hall element and a magnet or an optical rotation angle sensor composed of a light emitter and a light receiver, or the like.

A motor 33 for steering is an electric motor joined to the column shaft 35 with the interposition of a reducer (not illustrated). When the motor 33 for steering is rotated, the steering wheel 32 rotates together with the column shaft 35. Operation of the motor 33 for steering is switched according to the driving mode of the dump truck 1. In the case of an automatic driving mode, the motor 33 for steering generates steering torque that rotates the steering wheel 32 (column shaft 35) to control steering of the dump truck 1 (operation of the steering device 12). In the case of a manual driving mode, the motor 33 for steering generates assist torque that assists steering torque necessary for operation of the steering wheel 32 by the riding person. The torque generated by the motor 33 for steering may be set to zero in the case of the manual driving mode.

The accelerator pedal 50 configures an acceleration operation device with which acceleration of the dump truck 1 is operated. Pressing operation of this accelerator pedal 50 can be carried out by the riding person. An accelerator operation sensor (not illustrated) that senses the amount of operation is disposed for the accelerator pedal 50. The accelerator operation sensor outputs an acceleration command according to the amount of operation (amount of pressing) of the accelerator pedal 50 to the controller 100. The controller 100 causes the motors 13L and 13R for travelling to carry out powering according to the amount of operation of the accelerator pedal 50 and thereby the dump truck 1 accelerates.

The normal brake pedal 51 configures a braking operation device with which braking of the dump truck 1 is operated. Pressing operation of this normal brake pedal 51 can be carried out by the riding person. A normal brake operation sensor (not illustrated) that senses the amount of operation is disposed for the normal brake pedal 51. The normal brake operation sensor outputs a braking command according to the amount of operation (amount of pressing) of the normal brake pedal 51 to the controller 100. The controller 100 causes the motors 13L and 13R for travelling to carry out regeneration according to the amount of operation of the normal brake pedal 51 and thereby the dump truck 1 decelerates.

The controller 100 can determine which of the acceleration state and the deceleration state the dump truck 1 is in on the basis of the acceleration command from the accelerator pedal 50 and the braking command from the normal brake pedal 51.

To the front wheels 6L and 6R and the rear wheels 7L and 7R, for example, a mechanical braking device (mechanical brake) like a disc brake is attached as an emergency brake device 54. For the emergency brake device 54, a braking state and a braking-released state are controlled by operation of the emergency brake pedal 52. A configuration may be made in such a manner that, by operation of the emergency brake pedal 52, not only the emergency brake device 54 (mechanical brake) but also a retarder brake such as an electric brake that causes braking through applying electrical resistance to rotation of the rear wheels 7L and 7R is actuated.

As other operation devices 53, a shift lever for switching the travelling direction of the vehicle, a safety button that forcibly stops the engine, and so forth are included.

The steering wheel angular velocity sensor 34 can be used as an override operation sensor for sensing override operation through which switching between the automatic driving mode and the manual driving mode is carried out. Furthermore, the accelerator operation sensor that senses the amount of operation of the accelerator pedal 50, the normal brake operation sensor that senses the amount of operation of the normal brake pedal 51, an emergency brake operation sensor that senses the amount of operation of the emergency brake pedal 52, a sensor that senses the amount of operation of another operation device 53, and so forth can also be used as the override operation sensor. They are just one example of the override operation sensor and any sensor can be used as the override operation sensor as long as it is a sensor that can sense manual operation of various operation devices by the riding person. It is desirable for the override operation sensor to execute limiting by setting of a control threshold and filtering processing in order not to cause unnecessary erroneous determination.

To the controller 100, a first selection switch 59a and a second selection switch 52b are connected as a selection device for selecting any one of driving modes from among plural driving modes including the manual driving mode, a manned automatic driving mode, and an unmanned automatic driving mode. The first selection switch 59a is a switch for selecting either one of the manual driving mode in which the dump truck 1 travels by driving operation by a riding person (referred to also as manned manual driving mode) and the automatic driving mode in which the dump truck 1 autonomously travels without depending on driving operation by the riding person (manual driving/automatic driving changeover switch). The second selection switch 59b is a switch for selecting either one of the manned automatic driving mode in which the dump truck 1 autonomously travels in the state in which a riding person is present in the dump truck 1 and the unmanned automatic driving mode in which the dump truck 1 autonomously travels in the state in which a riding person is absent in the dump truck 1 (manned automatic driving/unmanned automatic driving changeover switch). In the present embodiment, the manned automatic driving mode and the unmanned automatic driving mode are often collectively referred to as the automatic driving mode. The controller 100 carries out travelling control of the dump truck 1 on the basis of the driving mode selected by the first selection switch 59a and the second selection switch 52b. In the present embodiment, the case in which the means to select the driving mode of the dump truck 1 is switches (first selection switch 59a and second selection switch 59b) will be described. However, for example, a configuration may be employed in which a signal output from the control system 41 (mode selection command) is received by a radio device and the driving mode defined by the signal is selected. In the plural driving modes that can be selected by the driving mode selection switches 59, at least two driving modes of the automatic driving mode in which the dump truck 1 autonomously travels without depending on driving operation by a riding person and the manual driving mode in which the dump truck 1 travels by driving operation by the riding person are included.

The radio device antenna 37a is connected to a radio device 37 that is a device for allowing the controller 100 to mutually communicate with an external terminal (for example, the control system 41 or the operation management system 42, which is a computer in the control room 40). The radio device 37 transmits data output from the controller 100 from the radio device antenna 37a and inputs data (for example, travelling route data to be described later) received by the radio device antenna 37a to the controller 100.

The GPS antenna (satellite positioning antenna) 36a is connected to a GPS receiver 36 as a position sensor that receives satellite signals from plural positioning satellites received by the GPS antenna 36a and calculates the position of the dump truck 1 in the world coordinate system (or geographic coordinate system). The GPS receiver 36 outputs the calculated position of the dump truck 1 to the controller 100.

An azimuth sensor 38 is an instrument for sensing the azimuth of the dump truck 1. In the present embodiment, a digital azimuth meter that senses the geomagnetism by a sensor and determines the orientation is used.

(Controller 100)

The controller 100 is a controller (microcomputer) including a calculation processing device (for example, processor such as a CPU), a storing device (for example, semiconductor memory such as ROM and RAM), an input-output circuit, and a communication circuit, and is configured to be capable of executing various kinds of processing defined by a program stored in the storing device through execution of the program by the calculation processing device. The controller 100 in the present embodiment carries out control of the motors 13L and 13R for travelling and the motor 33 for steering mainly for execution of autonomous travelling when the automatic driving mode is currently selected.

As illustrated in FIG. 2, by executing the program stored in the storing device by the calculation control device, the controller 100 functions as a travelling route storing section 60, a vehicle position-posture measuring section 61, a travelling control section 62, an override sensing section 63, a mode determining section 64, and a failure determining section 65. The travelling control section 62 includes the speed control section 62a and a steering control section 62b. The respective sections 60 to 65 may be configured by plural controllers as appropriate. Furthermore, the failure determining section 65 can be omitted in a first embodiment.

The travelling route storing section 60 is a storage area for the travelling route ensured in the storing device of the controller 100, and data (travelling route data) that defines a preset travelling route of the dump truck 1 is stored therein. The travelling route data can be defined by a set of coordinate values of plural points disposed on a travelling route of the dump truck 1 with the interposition of intervals, for example. Regarding the travelling route, a configuration may be employed in which the shape of a travelling road is sensed by an external world recognizing device such as a camera or radar and the controller 100 computes the travelling route in conformity with the shape during vehicle travelling in real time (for example, sets the travelling route at a position separate from either the left or right end part of the travelling road by a predetermined distance) and stores the travelling route in the travelling route storing section 60.

The vehicle position-posture measuring section 61 is a section that executes processing of measuring the present position (for example, the position of the center of gravity of the dump truck 1), orientation (azimuth), yaw rate, and speed of the dump truck 1 on the basis of input data from the GPS receiver 36 and the azimuth sensor 38. Among them, for example, the yaw rate can be calculated from time change of the azimuth sensor 38 and the speed can be calculated from time change in the positioning result of the GPS receiver 36. The position and orientation of the vehicle may be measured by using not only the GPS receiver 36 and the azimuth sensor 38 but, for example, a wheel speed sensor that senses the speed of the front wheels 6L and 6R, an inertial measurement device (IMU: Inertial Measurement Unit) that can sense the angle and acceleration of three axes, and so forth alone or in combination. Furthermore, a method may be used in which the relative position and orientation of the dump truck 1 with respect to the travelling route are obtained by external world recognizing means such as a camera or radar.

The mode determining section 64 is a section that executes processing of determining the driving mode selected through the first selection switch 59a and the second selection switch 59b on the basis of input signals from the first selection switch 59a and the second selection switch 59b.

Figure 3:
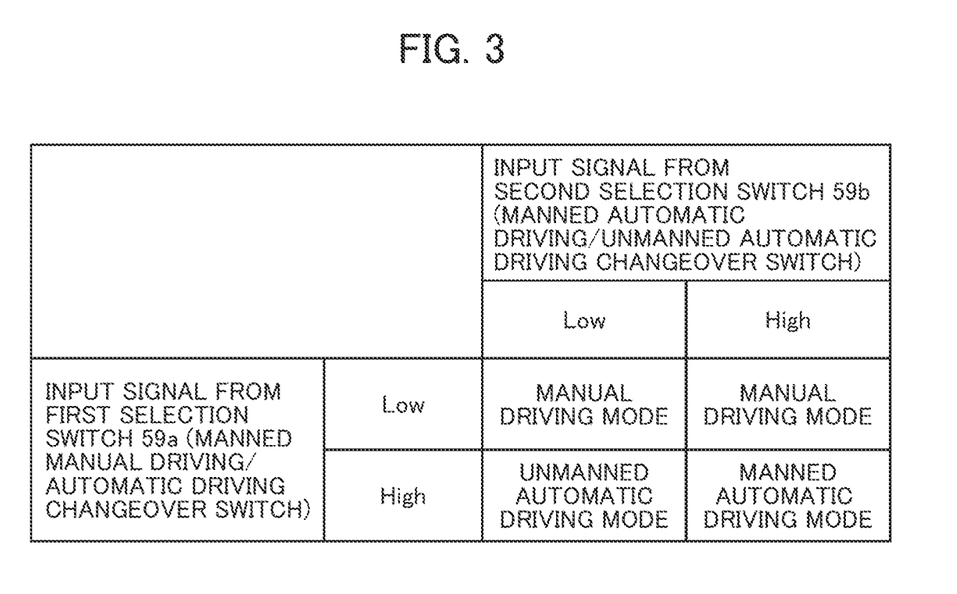
FIG. 3 is a correspondence diagram of switching positions of two selection switches 59a and 59b and a driving mode.

Determination processing of the driving mode by the mode determining section 64 will be described by using FIG. 3. Suppose that the first selection switch 59a and the second selection switch 59b are each a switch switched between an ON position (first position) and an OFF position (second position) and output a High signal to the controller 100 (mode determining section 64) when being switched to the ON position and output a Low signal to the controller 100 (mode determining section 64) when being switched to the OFF position.

First, when the input signal from the first selection switch 59a is the Low signal, the mode determining section 64 determines that the manual driving mode is selected irrespective of the switching position (contents of the input signal) of the second selection switch 59b. Furthermore, when the input signal from the first selection switch 59a is the High signal and the input signal from the second selection switch 59b is the Low signal, the mode determining section 64 determines that the unmanned automatic driving mode is selected. Moreover, when the input signal from the first selection switch 59a is the High signal and the input signal from the second selection switch 59b is the High signal, the mode determining section 64 determines that the manned automatic driving mode is selected.

The mode determining section 64 outputs the above-described determination result to the travelling control section 62 and the override sensing section 63. That is, the mode determining section 64 outputs which of the manual driving mode, the manned automatic driving mode, and the unmanned automatic driving mode is selected to the travelling control section 62 and the override sensing section 63.

The driving mode of the dump truck 1 is not switched during driving except for the case in which override operation occurs. Therefore, it is desirable that the mode is determined by the mode determining section 64 before start of driving of the dump truck 1 and driving is started after a riding person or control operator has checked the determination result thereof.

The override sensing section 63 is a section that executes processing of sensing override operation on the basis of an input signal from the override operation sensor (for example, steering wheel angular velocity sensor 34) while the automatic driving mode (manned automatic driving mode and unmanned automatic driving mode) is selected by the first selection switch 59a and the second selection switch 59b. The override sensing section 63, when sensing override operation, outputs an override operation sensing signal to the mode determining section 64.

Figure 4:
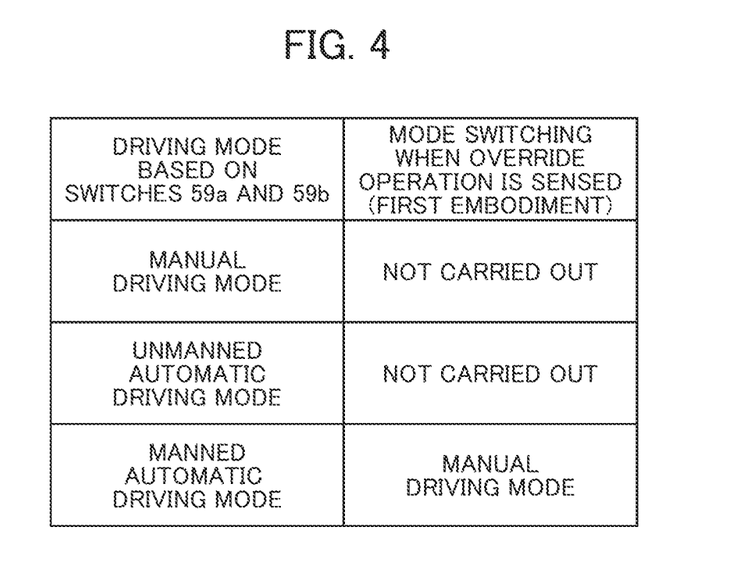
FIG. 4 is a diagram in which mode switching operation carried out by a mode determining section 64 when an override operation sensing signal is input in a first embodiment is marshaled.

FIG. 4 is a diagram in which mode switching operation carried out by the mode determining section 64 when the override operation sensing signal is input in the first embodiment is marshaled. As illustrated in this diagram, the mode determining section 64 does not switch the driving mode when the override operation sensing signal is input in the case in which the unmanned automatic driving mode is selected by the first selection switch 59a and the second selection switch 59b. That is, the unmanned automatic driving mode is continued. On the other hand, the mode determining section 64 switches the driving mode from the manned automatic driving mode to the manned manual driving mode when the override operation sensing signal is input in the case in which the manned automatic driving mode is selected by the first selection switch 59a and the second selection switch 59b. That is, driving mode switching to the manned manual driving mode occurs. As a result, when override operation is sensed in automatic driving, the travelling control section 62 selects different travelling control according to whether the driving mode determined on the basis of the selection switches 59a and 59b is the manned automatic driving mode or the unmanned automatic driving mode (details will be described later). In the case of the manual driving mode, sensing of override operation is not carried out. Therefore, it is explained in the diagram that the mode switching is "not carried out."

The travelling control section 62 is a section that carries out control for allowing the dump truck 1 to carry out autonomous travelling or manual travelling by a riding person, and includes the speed control section 62a that carries out control of the motors 13L and 13R for travelling and the steering control section 62b that carries out control of the motor 33 for steering.

The travelling control section 62 switches travelling control of the dump truck 1 according to the driving mode determined by the mode determining section 64.

The speed control section 62a, at the time of the automatic driving mode (manned automatic driving mode and unmanned automatic driving mode), controls powering and regeneration by the left and right motors 13L and 13R for travelling in such a manner that the speed (actual speed) of the dump truck 1 calculated by the vehicle position-posture measuring section 61 gets closer to a target speed set regarding a travelling route 21. At the time of the manual driving mode, the speed control section 62a controls powering by the left and right motors 13L and 13R for travelling according to the amount of operation of the accelerator pedal 50 and controls regeneration by the left and right motors 13L and 13R for travelling according to the amount of operation of the normal brake pedal 51.

The steering control section 62b, at the time of the automatic driving mode (manned automatic driving mode and unmanned automatic driving mode), calculates target steering torque that is the steering torque of the motor 33 for steering necessary for steering the dump truck 1 along the travelling route stored in the travelling route storing section 60 on the basis of the position of the dump truck 1 that is calculated by the GPS receiver 36 and is input to the vehicle position-posture measuring section 61, the azimuth (orientation) of the dump truck 1 sensed by the azimuth sensor 38, and the travelling route stored in the travelling route storing section 60, and controls the steering torque of the motor 33 for steering on the basis of the target steering torque. Due to this, the dump truck 1 is steered to travel along the travelling route. For the calculation of the target steering torque, for the purpose of improving the accuracy thereof, at least one of the steering wheel angular velocity sensed by the steering wheel angular velocity sensor 34, the steering angle θ sensed by the steering angle sensor 39, the vehicle speed calculated by the vehicle position-posture measuring section 61, and the yaw rate calculated by the vehicle position-posture measuring section 61 may be considered.

At the time of the manual driving mode, the steering control section 62b controls the steering torque (target steering torque) of the motor 33 for steering in such a manner that assist torque that assists the steering torque necessary for the riding person to operate the steering wheel 32 is generated as appropriate according to operation of the steering wheel 32 by the riding person (for example, sensed value of the steering wheel angular velocity sensor 34). The assist torque can be calculated on the basis of the steering wheel angular velocity sensed by the steering wheel angular velocity sensor 34 and the vehicle speed acquired by the vehicle position-posture measuring section 61, for example. A torque sensor may be attached instead of the steering wheel angular velocity sensor 34 and the assist torque may be calculated from the steering torque sensed by the sensor and the vehicle speed. The calculation of the target steering torque may be suspended and the operation of the motor 33 for steering may be stopped.

Figure 5:
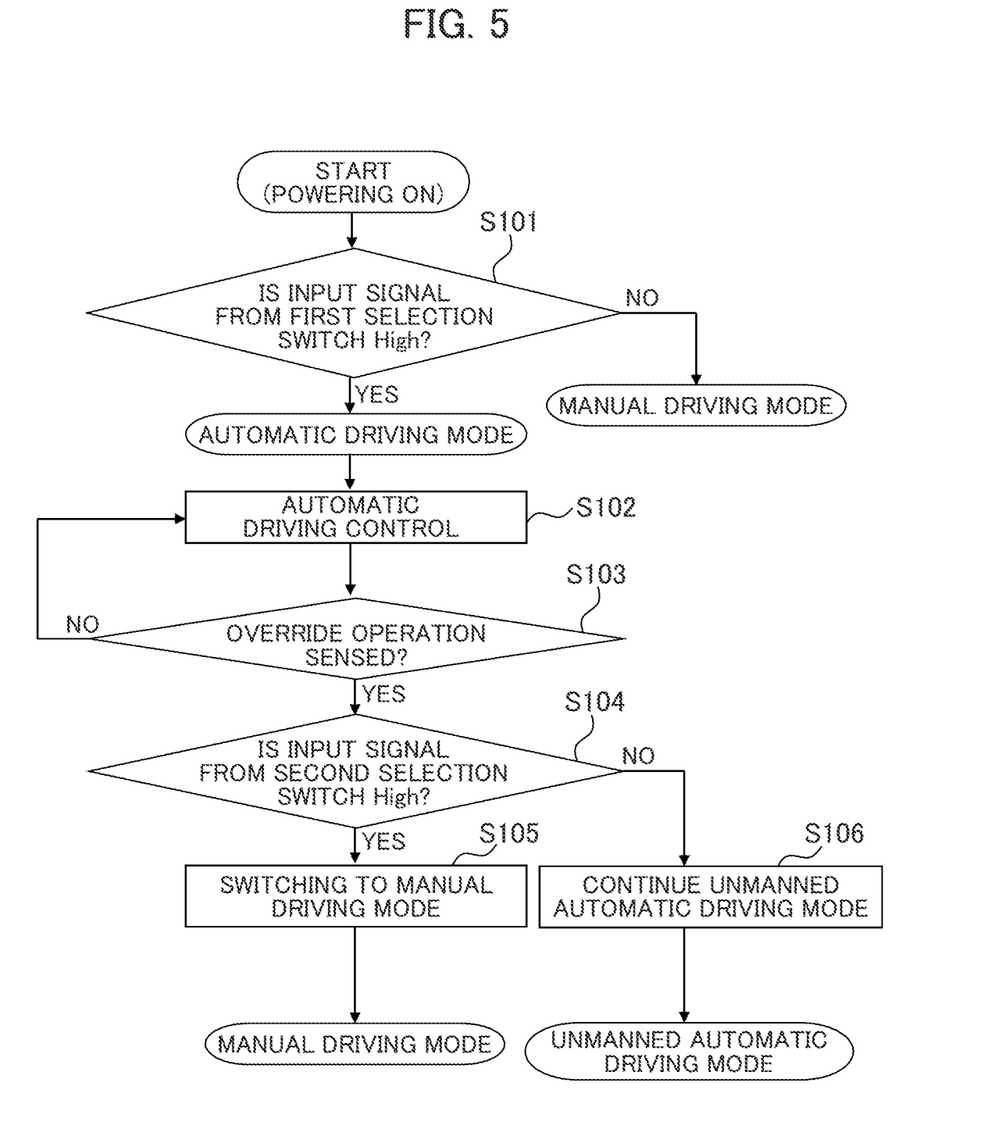
FIG. 5 is a flowchart of processing executed by a controller 100 according to the first embodiment.

FIG. 5 is a flowchart of one example of processing executed by the controller 100 according to the first embodiment of the present invention. The controller 100 starts the processing of FIG. 5 at the time of powering-on of the dump truck 1 (at the time of activation). However, a desired driving mode is set by the first selection switch 59a and the second selection switch 59b before the powering-on.

First, in S101, the controller 100 (mode determining section 64) determines whether or not an input signal from the first selection switch 59a is the High signal. When the input signal is the Low signal (that is, when the determination of S101 is NO), the controller 100 determines that the selected driving mode is the manual driving mode, and starts travelling control based on the manual driving mode by the travelling control section 62. Details of the travelling control at the time of the manual driving mode are as already described.

On the other hand, when the input signal is the High signal in S101 (that is, when the determination of S101 is YES), the controller 100 determines that the selected driving mode is the manned automatic driving mode or the unmanned automatic driving mode, and starts travelling control based on the automatic driving mode, i.e. autonomous travelling (automatic driving), by the travelling control section 62 (S102). Details of the travelling control at the time of the automatic driving mode are also as already described.

In S103, the controller 100 (override sensing section 63) determines whether or not override operation has been sensed by the override operation sensor (for example, steering wheel angular velocity sensor 34) in the automatic driving. When override operation has not been sensed, the automatic driving control of S102 is continued. On the other hand, when, in S103, the output value of the steering wheel angular velocity sensor 34 is different from the target value of the automatic driving, for example, and override operation by the riding person has been sensed, the processing is moved to S104.

In S104, the controller 100 (mode determining section 64) determines whether or not an input signal from the second selection switch 59b is the High signal. When the input signal is the Low signal (that is, when the determination of S104 is NO), the unmanned automatic driving mode, which is the selected driving mode, is continued. In this case, it is preferable to wirelessly inform the control system 41 in the control room 40 of the fact that the override operation, which is essentially impossible in the unmanned automatic driving, has been sensed.

On the other hand, when the input signal is the High signal in S104 (that is, when the determination of S104 is YES), switching from the manned automatic driving mode, which is the selected driving mode, to the manual driving mode is carried out. Due to this, travelling control based on the manual driving mode is started by the travelling control section 62.

As above, by switching control of the automatic driving vehicle depending on whether or not a riding person is present, the optimum method for ensuring the safety of the dump truck 1 and the riding person can be selected.

(Effects)

As above, in the dump truck 1 of the present embodiment, when override operation is sensed while the manned automatic driving mode, in which a riding person exists, is selected, it is determined that the riding person has attempted to operate an operation device (for example, steering wheel 32) on the basis of person's own intention, and switching from the manned automatic driving mode to the manual driving mode is carried out. This can surely entrust control of the vehicle to driving by the riding person. On the other hand, when override operation is sensed while the unmanned automatic driving mode, in which a riding person does not exist, is selected, switching to the manual driving mode is not carried out and the unmanned automatic driving mode is continued because an operation device is not operated in the unmanned state and the sensing of the override operation is highly likely to be incorrect. That is, abandonment of the vehicle control by the controller 100 is prohibited in the state in which a riding person does not exist and therefore the reliability of the system can be improved.

Furthermore, in the present embodiment, the configuration is employed in which the automatic driving mode is separated into two modes of the manned automatic driving mode and the unmanned automatic driving mode and either one of these two automatic driving modes is selected by the selection switch 59*b*. Due to this configuration, determination of whether the automatic driving mode is manned or unmanned can be surely carried out on the basis of the input signal from the switch 59*b*. Therefore, determination of the driving mode, in other words, determination of whether or not a riding person is present, can be surely carried out. That is, whether the vehicle is manned or unmanned can be determined easily and clearly on the basis of the switching position of the switch. Therefore, the possibility of execution of control different from the intention of the control room or the riding person can be reduced.

Accordingly, according to the present embodiment, sure and proper control of the self-vehicle can be carried out when override operation is sensed in the automatic driving condition of each of manned automatic driving and unmanned automatic driving.

Second Embodiment

Next, a second embodiment of the present invention will be described. The hardware configuration of the present embodiment is the same as the first embodiment and therefore description thereof is omitted.

Figure 6:
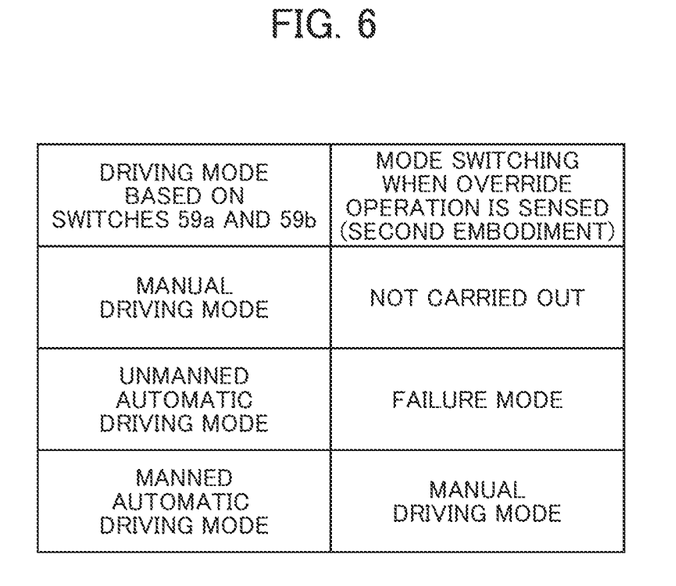
FIG. 6 is a diagram in which mode switching operation carried out by the mode determining section 64 when the override operation sensing signal is input in a second embodiment is marshaled.

FIG. 6 is a diagram in which mode switching operation carried out by the mode determining section 64 when the override operation sensing signal is input in the second embodiment is marshaled. As illustrated in this diagram, the mode determining section 64 switches the driving mode to a failure mode that is one kind of the unmanned automatic driving mode when the override operation sensing signal is input in the case in which the unmanned automatic driving mode is selected by the first selection switch 59*a* and the second selection switch 59*b*.

On the other hand, when the override operation sensing signal is input in the case in which the manned automatic driving mode is selected by the first selection switch 59*a* and the second selection switch 59*b*, the mode determining section 64 switches the driving mode from the manned automatic driving mode to the manned manual driving mode similarly to the first embodiment.

At the time of the failure mode, the travelling control section 62 continues steering control with use of the motor 33 for steering by the steering control section 62*b*, whereas the speed control section 62*a* transmits a deceleration command to the motors 13L and 13R for travelling to stop the dump truck 1. At this time, the emergency brake device 54 may be used and the dump truck 1 may be guided to a side of the travelling road by an external world recognizing device such as a camera and be stopped.

Figure 7:
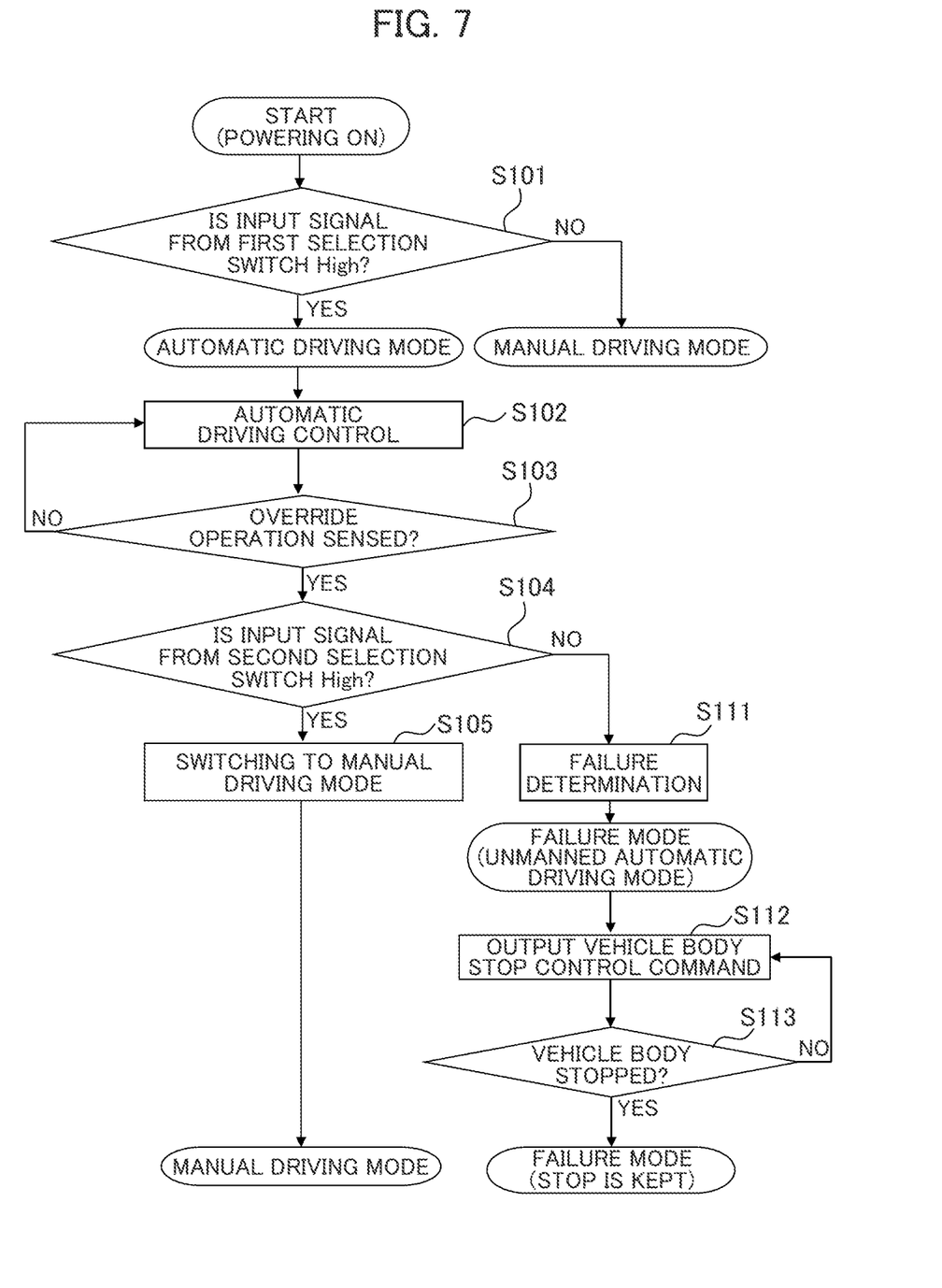
FIG. 7 is a flowchart of processing executed by the controller 100 according to the second embodiment.

FIG. 7 is a flowchart of one example of processing executed by the controller 100 according to the second embodiment of the present invention. S101 to S105 are the same as the flowchart of FIG. 5 and therefore description thereof is omitted.

In S111, the controller 100 (failure determining section 65) determines that a failure has occurred, and makes a transition to the failure mode. In S112, the controller 100 (travelling control section 62) outputs a vehicle body stop control command. Specifically, the controller 100 (travelling control section 62) continues the steering command to the motor 33 for steering. In addition, the controller 100 (travelling control section 62) transmits a deceleration command to the motors 13L and 13R for travelling and stops the dump truck 1 by controlling either or both the emergency brake device 54 and the motors 13L and 13R for travelling.

After determining that the vehicle body has been stopped in S113, the controller 100 keeps the stop state of the vehicle body.

As above, in the present embodiment, when override operation is sensed in the case in which the unmanned automatic driving mode is selected, the controller 100 determines that a failure has occurred and stops the vehicle. This can prevent the dump truck 1 involving the possibility of a failure from autonomously travelling continuously.

(Others)

The present invention is not limited to the above-described embodiments and various modification examples in such a range as not to depart from the gist thereof are included. For example, the present invention is not limited to what includes all configurations explained in the above-described embodiment and what are obtained by deleting part of the configurations are also included. Furthermore, part of configurations according to a certain embodiment can be added to or substituted for a configuration according to another embodiment.

In the above, description has been made by taking as an example the case in which mainly the steering wheel angular velocity sensor 34 functions as the override operation sensor. However, a sensor that senses operation of another operation device (for example, accelerator pedal 50, normal brake pedal 51, emergency brake pedal 52, other operation devices 53) that can be operated by a riding person may be used as the override operation sensor.

Furthermore, regarding the respective configurations relating to the above-described controller 100, functions and execution processing of these respective configurations, and so forth, part or all of them may be implemented by hardware (for example, logic to execute the respective functions is designed with an integrated circuit). Moreover, as the configurations relating to the above-described controller 100, a program (software) that is read out and executed by a calculation processing device (for example, CPU) to cause implementation of the respective functions relating to the configurations of the controller 100 may be employed. Information relating to this program can be stored in semiconductor memory (flash memory, SSD, and so forth), magnetic storing device (hard disk drive and so forth), recording medium (magnetic disc, optical disc, and so forth), and so forth.

Moreover, in the explanation of the above-described respective embodiments, as control lines and information lines, what are understood as necessary ones for the explanation of these embodiments are shown. However, all control lines and information lines relating to products are not necessarily shown. It may be thought that actually almost all configurations are mutually connected.

DESCRIPTION OF REFERENCE CHARACTERS

1: Dump truck (work vehicle, transportation vehicle)
2: Vehicle body
3: Vessel
4: Hoist cylinder
5: Cab
6L: Front wheel
6R: Front wheel
7L: Rear wheel
7R: Rear wheel
12: Steering device
13L: Motor for travelling
13R: Motor for travelling
21: Travelling route
32: Steering wheel
33: Motor for steering
34: Steering wheel angular velocity sensor (operation sensor)
35: Column shaft
36: GPS receiver
36a: GPS antenna (satellite positioning antenna)
37: Radio device
37a: Radio device antenna
38: Azimuth sensor
39: Steering angle sensor
50: Accelerator pedal
51: Brake pedal
59: Driving mode selection switch
60: Travelling route storing section
61: Vehicle position-posture measuring section
62: Travelling control section
62a: Speed control section
62b: Steering control section
63: Override sensing section
64: Mode determining section
65: Failure determining section
100: Controller

The invention claimed is:

1. A work vehicle having, as driving modes, at least two modes of an automatic driving mode in which the work vehicle autonomously travels without depending on driving operation by a riding person and a manual driving mode in which the work vehicle travels by driving operation by the riding person, in the automatic driving mode, a manned automatic driving mode in which the work vehicle autonomously travels in a state in which the riding person is present and an unmanned automatic driving mode in which the work vehicle autonomously travels in a state in which the riding person is absent being included, the work vehicle comprising:

an override operation sensor that senses override operation to carry out switching between the automatic driving mode and the manual driving mode;
a selection device for selecting any one of driving modes in the manual driving mode, the manned automatic driving mode, and the unmanned automatic driving mode as the driving mode; and
a controller that controls the work vehicle on a basis of the driving mode selected by the selection device, the controller being configured to carry out switching from the manned automatic driving mode to the manual driving mode as soon override operation is sensed by the override operation sensor in a case in which the manned automatic driving mode is selected by the selection device, and continue autonomous traveling of the work vehicle in the unmanned automatic driving mode even if override operation is sensed by the override operation sensor in a case in which the unmanned automatic driving mode is selected by the selection device;
wherein the selection device includes a first selection switch for selecting either one of the manual driving mode and the automatic driving mode and
a second selection switch for selecting either one of the manned automatic driving mode and the unmanned automatic driving mode, and
the controller is configured to
carry out switching from the manned automatic driving mode to the manual driving mode when override operation is sensed by the override operation sensor in a case in which the automatic driving mode is selected by the first selection switch and the manned automatic driving mode is selected by the second selection switch,
continue the unmanned automatic driving mode when override operation is sensed by the override operation sensor in a case in which the automatic driving mode is selected by the first selection switch and the unmanned automatic driving mode is selected by the second selection switch, and
control the work vehicle on a basis of the manual driving mode irrespective of a switching position of the second selection switch in a case in which the manual driving mode is selected by the first selection switch.

* * * * *